United States Patent Office 3,301,681
Patented Jan. 31, 1967

3,301,681
METHOD FOR PREPARING DRY FREE FLOWING FOOD SUPPLEMENT CONTAINING HYDRATED DI-CALCIUM PHOSPHATE
William Kuster, Hillsborough, Calif., assignor, by mesne assignments, to Eagle-Ottawa Leather Company, Grand Haven, Mich., a corporation of Illinois
No Drawing. Filed Mar. 4, 1963, Ser. No. 262,384
5 Claims. (Cl. 99—7)

This invention relates to a new and improved method for preparing a nutritional feed supplement rich in protein from animal by-products through acid hydrolysis and the product obtained therefrom. More particularly, the invention provides such a method wherein phosphoric acid is used for the hydrolysis, and the product therefrom is characterized by its dry, free-flowing nature, and which may be used for feeding to humans as well as animals.

The present invention is related to the invention described and claimed in United States Patent No. 3,000,-742, patented September 19, 1961. The present invention is applicable to the same general class of materials described therein and in many respects follows the general techniques there described. The present method and product differs from said patent in that the present product is dry and free-flowing and contains little or no fat.

Under certain conditions, such as where the feed is to be shipped or stored in sacks, it is desirable to have a feed supplement such as the one provided by the present method. Heretofore it has not been possible to provide such a dry, free-owing product because of the difficulties encountered when the water content was directly reduced to the necessary level. Thus, after the protein had been hydrolyzed and separated from the unwanted constituents of the animal by-products, it has not been feasible to evaporate the water content so as to leave a suitably dry product. The reason for this is due to the nature of the complex protein mixture involved. When the protein is heated or dried by any suitable manner and the water content reduced below a certain point, the protein becomes increasingly tacky. If the water level is even further reduced, the tackiness becomes so great as to make the product totally unmanageable or workable, sticking to the equipment and presenting other like problems.

The purpose of the present invention is to provide a way of eliminating the moisture to the point where a dry, free-flowing product is obtained, but where the tacky stage heretofore encountered during the moisture removal is obviated. The gist of the present invention involves reducing the moisture level of the phosphoric acid hydrolyzed protein obtained from the animal by-products to a relatively low level, but not so low that the material commences to be unmanageably tacky. At that point, instead of continuing to conventionally remove moisture, a suitable calcium compound such as calcium carbonate is added in an amount sufficient to approximately neutralize the hydrolyzing acid initially employed on the animal by-product. In addition to creating the desired neutral state, the calcium combines with the calcium mono-phosphates present in the hydrolyzate protein mixture to form di-calcium phosphates. These di-calcium phosphates contain 2 molecules of water of hydration. This water of hydration is obtained from the moisture remaining in the hydrolyzate mixture. By having suitably lowered the moisture content preparatory to the addition of the calcium carbonate, the amount of water remaining is suitably that which can be taken up by the di-calcium phosphate to render the product free-flowing. As will be appreciated by those skilled in the art, the di-calcium phosphate may be permitted to remain as part of the food supplement product since it is nutritious and beneficial to the consuming animal. At the same time the product obtained contains a low enough level of free water to be thereby rendered dry and free-flowing. Since the moisture removal as by evaporation was discontinued before the product became tacky, the difficulties encountered when drying products of the present type are avoided.

It should be noted that a "dry" product as used herein may contain about 5–8% moisture and still be free-flowing and appear to be dry. The term "dry" should be so construed as to include such "commercially dry" materials. It should also be noted that 5–8% moisture may result in a "dry" product where the ash content is high enough while the same moisture content may yield a tacky product where the ash content is low.

As in the above cited patent, the present method is applicable to the group of materials known as "animal by-products." This term as used throughout this specification and claims is meant to include such materials as tannery fleshings and hide trim, both green and limed, as well as poultry viscera, trimmings, and the like. It also includes various sea foods such as fish, shell fish, and other proteinaceous sea life.

The materials used in the present method are suitably employed as is, or they may be subjected to a pretreatment such as the removal of electrolytes that may be present where limed or delimed fleshings and trim are employed. In practicing the present invention the selected animal by-products are deposited continuously or in batches in a hydrolysis chamber. At this stage the animal by-products are subjected to hydrolysis with phosphoric acid in aqueous solution at a pH of about 1–3, and preferably at a pH of less than about 2. Hydrolysis of the protein in the animal by-products is promoted by the application of heat such as by injecting steam into the solution. Suitably, the heat is regulated so that the reaction temperature is under 300° F. and more preferably less than 250° F. In any event, the heat should be adjusted so that the protein is not adversely affected nutritionally.

Hydrolysis of the protein is continued until the protein reaches approximately the polypeptide stage. It should be understood that the protein and protein derivatives at this point are not all in a homogeneous stage, but the term "polypeptide" is intended to cover the average condition of the protein material. Thus some of the protein may be in the form of a peptone and just soluble in water while some of the protein may be converted to the peptide stage. When the protein has been converted to the polypeptide state it is removed in aqueous phase from the hydrolysis chamber and further treated as described hereinafter. Portions of the starting animal by-product protein that have not been so converted may be left in the hydrolysis chamber for further hydrolytic treatment until converted to the desired stage. The liquified protein that is removed from the hydrolysis chamber may contain undesired solid portions such as hair of the animal by-products which may be separated therefrom as by filtering or screening.

During the hydrolysis treatment the fat portions of the animal by-products, by reason of the heat applied, become fluid and liquified. During the removal of the liquified protein and during any screening or filtration which may be employed, the liquified fat is obtained along with the aqueous protein phase. Of course, the fat can be removed early in the process before any filtration or other treatment.

In a continuous process, and especially where a great deal of agitation occurs during the hydrolysis step, the protein and liquified fat continuously being removed from the hydrolysis chamber may be in an emulsified condition. Alternatively, and particularly in a batch process where hydrolysis is executed slowly and without much agitation, a majority of the fat may separate on top of the aqueous phase and can be easily removed. Since the end product herein principally desired is low or fat free, the next step in the present method is to separate the necessary amount of fat from the hydrolyzed protein that yields a product of the desired composition and consistency. This may be accomplished by any conventional technique for separating fat from an aqueous phase. Thus the separation may be accomplished by heating the emulsion where present to "break" it, and the fat layer decanted from the aqueous phase. It is also suitable to add an electrolyte such as salt (sodium chloride) or other commercial emulsion breakers for accomplishing the same purpose. In addition to the emulsion breakers or in lieu thereof, the fat may be separated from the aqueous protein layer by means of centrifuging. Where the fat separates during hydrolysis as in a batch process, separation may be accomplished by direct physical manipulation at that time.

Following the separation of the fat from the aqueous phase, the aqueous phase remains at a low pH due to the presence of the phosphoric acid and mono-calcium phosphate during the hydrolysis step. Drying the aqueous phase protein is then commenced by reduction of the water content. Water reduction is accomplished by any suitable method. In the preferred embodiment the water is reduced by evaporation by heating the solution with or without the aid of a vacuum. Water reduction is continued as far as possible but is ceased before the protein becomes too tacky to permit physical handling for the succeeding stages to be described. Some water reduction usually occurs during hydrolysis due to the heat utilized. In some cases this reduction may in itself be great enough to preclude the necessity of further water reduction such as by vacuum evaporation.

The amount of moisture that should be left with the protein will vary depending upon the composition of the product. In general the water content of the product at this stage will be in the range of about 7–40%. Where the ash content is low it may be necessary to cease water reduction when the water content drops to about 20–30%. On the other hand, where the ash content is high, it may be possible to reduce the moisture to as low as 5% or less before the product becomes undesirably tacky. In any event, water reduction is suitably executed so that the water quantity that remains is low enough to be bound as water of hydration upon addition of the calcium compound in the next stage of treatment, leaving a normal "dry" water content of about 5–8%, i.e. the product is rendered commercially dry. Because this quantity is variable and depends upon the starting material, the best method of ascertaining the permissible water content is by empirical methods.

Following water reduction to the appropriate stage, a calcium compound selected from calcium oxide, calcium hydroxide, and calcium carbonate (preferably calcium carbonate) is added to the protein in an amount sufficient to bring the pH toward neutrality, i.e. about a pH of 5–8 and preferably about 6–7. While the calcium compound serves to neutralize the product, the calcium ions present form a di-calcium phosphate salt from the mono-calcium phosphate salts present in solution in the protein hydrolyzate composition. The di-calcium phosphate salt contains 2 water molecules of hydration. This water is obtained from the remaining moisture in the composition. When the moisture is so combined with the di-calcium phosphate which is practically insoluble in water, it is no longer free and the product is rendered dry and free-flowing. This, of course, requires that the moisture content had been suitably reduced in the preceding step so that the amount of di-calcium phosphate present is sufficient to combine with enough of the remaining moisture to produce the desired dry state. As noted, this requirement is most conveniently determined empirically.

Aside from the chemical combination of the water, moisture is reduced by boiling caused from the heat of formation of the di-calcium phosphate from the mono-calcium phosphate. This heat is uniformly distributed throughout the mass and avoids problems caused by heating the outside of the mass such as increased tackiness.

Calcium carbonate is a preferred material since the carbonate ions are lost by conversion to $CO_2$ gas during the neutralization. Calcium oxide is conveniently used where foaming is a problem. Calcium hydroxide is least preferred since the hydroxyl group adds water to the neutralization reaction mixture.

Calcium carbonate has a unique advantage in the liberation of $CO_2$ gas. As the gas is liberated, it breaks the mass uniformly throughout and permits moisture release. This expansion of the gas disintegrates the tacky mass, allows steam to escape at lower temperatures without requiring pressure build-up, and leaves the product in a desirable granular consistency. The steam and $CO_2$ gas release in combination with the partial free moisture loss and the conversion of the calcium phosphate from the soluble state to the insoluble state results in a loose friable meal instead of the starting tacky mass. This granular meal, if desired, can now be subjected to additional drying in conventional equipment which could not be used on the tacky mass.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for preparing a dry, free-flowing food supplement rich in protein comprising hydrolyzing animal by-products with phosphoric acid at a pH of about 1–3 in aqueous solution and at an elevated temperature until the protein reaches about the polypeptide state of hydrolysis, separating and recovering the aqueous protein phase formed during said hydrolysis, reducing the water content of said aqueous protein phase, and then intermixing a calcium compound therewith selected from the group consisting of calcium oxide, calcium hydroxide, and calcium carbonate in an amount sufficient to raise the pH of said protein to about 5–7, thereby further removing water from said protein phase as water of hydration of di-calcium phosphate salt formed upon the addition of said calcium compound, said water reduction step being adjusted so as to leave an amount of water in said protein phase which yields a dry, free-flowing composition after the addition of said calcium compound.

2. A method for the preparation of a dry, free-flowing food supplement rich in protein comprising hydrolyzing animal by-products with phosphoric acid at a pH of less than about 3 in aqueous solution and at an elevated temperature under 300° F. until the protein reaches about the polypeptide state of hydrolysis and the fat is liquified, separating the liquid phase from remaining solids, separating a preselected amount of the fat from the aqueous protein phase of said liquid phase, reducing the water content of said aqueous protein phase, and then intermixing calcium carbonate therewith in an amount sufficient to raise the pH to about 6–7 and to thereby further remove water from the protein phase as water of hydration of di-calcium phosphate, said water reaction step being adjusted so as to leave an amount of water in said aqueous protein phase which yields a dry, free-flowing composition after the addition of said calcium carbonate thereto.

3. A method for the preparation of a dry, free-flowing food supplement rich in protein comprising hydrolyzing animal by-products with phosphoric acid at a pH of less than about 3 in aqueous solution and at an elevated temperature of less than about 250° F. until the protein reaches about the polypeptide state of hydrolysis and the fat is liquified, separating a preselected amount of the fat from the aqueous protein phase formed during said hydrolysis, reducing the water content of said aqueous protein phase to less than about 40% thereof by the application of heat thereto until the temperature rise of the protein phase exceeds the boiling point of water by about 15–50° F., and then intermixing a calcium compound therewith selected from the group consisting of calcium carbonate, calcium oxide, and calcium hydroxide in an amount sufficient to raise the pH of the protein phase to about 5–8, the intermixture of said calcium compound also being operable to further remove water from the protein phase as water of hydration of di-calcium phosphate to produce a dry, free-flowing product.

4. A method in accordance with claim 3 wherein the calcium compound is calcium carbonate.

5. A method for preparing a dry, free-flowing food supplement rich in protein comprising continuously hydrolyzing animal by-products with phosphoric acid at a pH of less than about 2 in aqueous solution and at an elevated temperature less than about 250° F. until the protein reaches about the polypeptide state of hydrolysis and the fat is liquified, continuously separating liquified fat and said polypeptide state protein in an aqueous phase as it is formed while continuing to hydrolyze remaining protein to the polypeptide state, separating a preselected amount of the fat from said aqueous phase polypeptide protein, then reducing the water content of the separated aqueous protein phase, and intermixing a calcium compound therewith selected from the group consisting of calcium carbonate, calcium oxide, and calcium hydroxide in an amount sufficient to raise the pH of the protein phase to about 6–7, said water reduction step being adjusted so as to leave an amount of water in said protein phase which yields a dry, free-flowing composition after the addition of said calcium compound thereto.

References Cited by the Examiner

UNITED STATES PATENTS

| | | | |
|---|---|---|---|
| 2,137,365 | 11/1938 | Srong | 99—7 |
| 2,566,549 | 9/1951 | Beckwith et al. | 99—7 |
| 2,617,729 | 11/1952 | Pacault | 99—7 |
| 2,635,104 | 4/1953 | Clayen | 99—7 |
| 2,667,416 | 1/1954 | McFee | 99—7 |
| 2,851,356 | 9/1958 | Bedford | 99—7 |
| 2,946,686 | 7/1960 | Gaver et al. | 99—10 |
| 3,000,742 | 9/1961 | Kuster | 99—7 |
| 3,003,880 | 10/1961 | Erickson | 99—10 |
| 3,114,638 | 12/1963 | Huhn et al. | 99—7 |

RAYMOND N. JONES, *Acting Primary Examiner.*

A. LOUIS MONACELL, D. DONOVAN,
*Assistant Examiners.*